United States Patent [19]
Narita

[11] 3,881,141
[45] Apr. 29, 1975

[54] REGENERATIVE BRAKE CONTROL CIRCUIT

[75] Inventor: Hiroshi Narita, Katsuta, Japan

[73] Assignee: Hitachi, Ltd., Tokyo, Japan

[22] Filed: Jan. 25, 1974

[21] Appl. No.: 436,722

[30] Foreign Application Priority Data
Jan. 29, 1973 Japan.................. 48-11055

[52] U.S. Cl................................ 318/87; 318/376
[51] Int. Cl. ........................................ H02p 3/14
[58] Field of Search ....... 318/86, 87, 375, 376, 379, 318/380, 88

[56] References Cited
UNITED STATES PATENTS
3,651,388  3/1972  Machin, Jr. et al.................. 318/88
3,800,197  3/1974  Mehta............................. 318/87 X Primary Examiner—Robert K. Schaefer
Assistant Examiner—W. E. Duncanson, Jr.
Attorney, Agent, or Firm—Craig & Antonelli

[57] ABSTRACT

There is disclosed a low-cost regenerative brake control circuit used for electric cars and the like which is capable of effecting regenerative braking on motors continuously over the range from a speed higher than the rated speed of the motors to a low speed and which comprises two motor circuits each including a series-connected motor and a reactor, each motor circuit being connected in parallel with a common chopper through a thyristor.

7 Claims, 7 Drawing Figures

REGENERATIVE BRAKE CONTROL CIRCUIT

The present invention relates to an improved regenerative brake control circuit using a chopper, or more in particular to a regenerative brake control circuit which is capable of regenerative control at a speed higher than the rated speed of a motor.

In the conventional regenerative brake control circuit using a chopper, the chopper circuit is first closed thereby to form a closed loop comprising at least a motor, a reactor and a chopper. The motor is used as a generator during the braking operation and therefore a current generated by the motor flows in the closed loop thereby to store electromagnetic energy in the reactor. A voltage drop in the chopper and other junction points is so small that the voltage across the reactor is substantially equal to the voltage generated by the motor. Next, the chopper is opened to thereby connect the series-connected motor and reactor to power source. The voltage across the motor and the reactor becomes higher than the source voltage and power is returned to the power source. With the decrease in the energy stored in the reactor, the voltage across the series-connected motor and reactor drops, and when it is decreased to a level lower than the source voltage, the current flowing to the power source is reduced accordingly to zero. By closing again the chopper circuit after the decrease of the current to the power source, the motor current is increased to thereby raise the voltage across the reactor again. Then, again connecting the motor circuit to the power source, a reverse current again flow to the power source. With repetition of the above process the motor current, that is, regenerative brake current can be controlled.

It is the prerequisite in the above-mentioned regenerative brake current control that the voltage generated in the motor be lower than the voltage of the power source. If the voltage generated in the motor is higher than the source voltage, the reverse current to the power source is not reduced to a sufficiently low level, even when the energy stored in the reactor is decreased. As the result, the regenerative brake current continues to flow, thereby making the brake control impossible.

The situation where the voltage generated in the motor is higher than the source voltage occurs, for example, when a plurality of motors mounted on an electric car are connected in series while they are driven at a speed higher than the rated speed thereof. This situation may be prevented by connecting the motors in parallel and providing each of the motors with a chopper circuit. However, the provision of a plurality of chopper circuits results in a very high cost.

An object of the present invention is to obviate the above-mentioned disadvantages of the conventional regenerative brake control circuits and provide a relatively low-cost control circuit capable of regeneratively braking the motors from a speed higher than the rated motor speed.

According to the present invention, there is provided a regenerative brake control circuit for a couple of motors, which is especially effective at high speed running of the motors and which comprises a couple of reactors each connected in series with each of the motors, the series connections of the motor and the reactor being connected in parallel with each other, a couple of semiconductor switches each connected with each of said series connection of motor and reactor, and a common chopper connected in series with the semiconductor switches; the control operation being performed so that the semiconductor switches are turned on and off alternately in synchronism with the on-off operation of the chopper thereby to control the current in the motors.

The circuit arrangement according to the present invention requires only one chopper circuit, resulting in a very low cost of the regenerative brake control circuit.

The above and other objects, features and advantages will be made apparent by the detailed description taken in conjunction with the accompanying drawings, in which.

Figure 1:
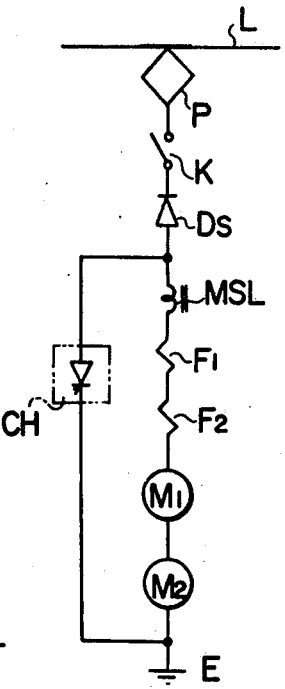
FIG. 1 is a diagram showing a conventional regenerative brake control circuit.

The configuration and operation of the conventional regenerative brake control apparatus using a chopper will be explained first with reference to FIG. 1, in which a couple of motors to be controlled are included for convenience of comparison with the apparatus according to the present invention. In the drawing, reference symbol L shows a trolley wire, symbol P a pantagraph, symbol K a circuit breaker, symbol Ds a diode for passing a regenerative current, symbol CH a chopper device, symbol MSL a reactor, symbols $F_1$ to $F_2$ field windings of the respective motors, symbols $M_1$ to $M_2$ armatures of the motors, and symbol E the earth.

Though the circuit is shown as including two motors $M_1$ $F_1$ and $M_2$ $F_2$, each of the indicated motors may actually consist of a series connection of two or more motors, the number depending on the rated voltage of the motor and the trolley wire voltage. It should be understood that reference to a motor in the specification and the claims represents one motor or a motor group consisting of a series-connected two or more motors.

Returning to FIG. 1, when the braker K is closed and the chopper CH is activated, a motor current flows in the closed loop comprising the armatures $M_1$ and $M_2$, field windings $F_1$ and $F_2$, reactor MSL and chopper CH. The resistance of this closed loop is so small that the motor current is increased sharply. When the chopper is cut off at a point where the motor current reaches a certain level, the inductive action of the reactor MSL causes the motor current to flow through the diode Ds and pantagraph P to the trolley wire L thereby to function as a regenerative brake. In the event that the sum of the induced voltage of the armatures $M_1$ and $M_2$ is lower than the voltage of the trolley wire, the regenerative brake current and hence motor current is decreased, while if it is higher than the voltage of the trolley wire, then the regenerative brake current is further increased thereby to make the control impossible. When the motor current is reduced to a predetermined level, as the former case is normal, the chopper CH is again activated to thereby increase the motor current. Similar control processes are repeated to control the motor current, that is, regenerative brake current. In this regenerative brake control operation using a chopper, it is necessary that the sum of the induced voltages of the armatures $M_1$ and $M_2$ be always lower than the voltage of the trolley wire.

Assume, for instance, that the voltage of the trolley wire is 1500 V and the induced voltage of each motor at their rated speed is 750 V. The regenerative brake control circuit shown in FIG. 1 is incapable of successful regenerative brake control operation at a speed higher than the rated speed.

Figure 2:
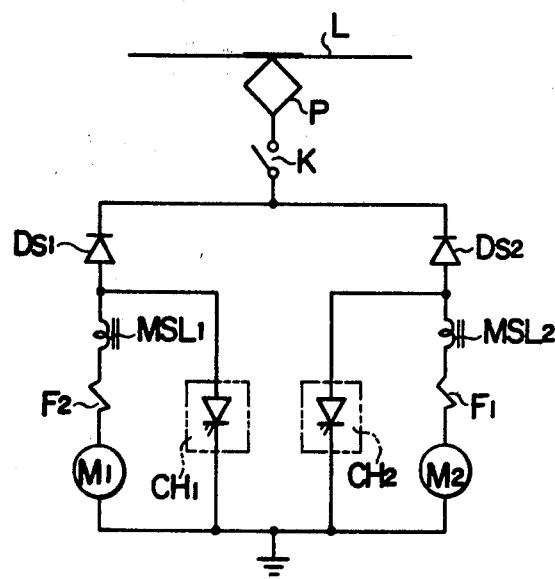
FIG. 2 is a diagram showing another conventional regenerative brake circuit adapted for operation at high motor speeds.

One alternative circuit arrangement to successfully effect the regenerative brake control at a speed higher than the rated value is shown in FIG. 2. In this circuit, a couple of motor circuits each including the series-connected motor $M_1$, $M_2$ and reactor $MSL_1$, $MSL_2$ are connected in parallel, each of the series circuits including the motor and reactor being connected in parallel with a chopper $CH_1$, $CH_2$, and the field windings $F_1$ and $F_2$ of the motors are cross-connected. Each of the motor circuits are electrically connected to trolley wire L through diode $DS_1$, $DS_2$, breaker K and pantagraph P. The manner in which the motor current, that is, regenerative brake current is controlled by the on-off operation of the choppers $CH_1$ and $CH_2$ is similar to that mentioned in detail with reference to the circuit of FIG. 1, and therefore will not be explained here. The circuit of FIG. 2 is capable of regulating the induced voltage of the motors up to the trolley wire voltage of 1500 V and therefore it is possible to effect the regenerative braking from a speed twice as high as the rated motor speed. In spite of this advantage, this arrangement suffers from the disadvantage of high production cost due to use of two choppers.

Figure 3:
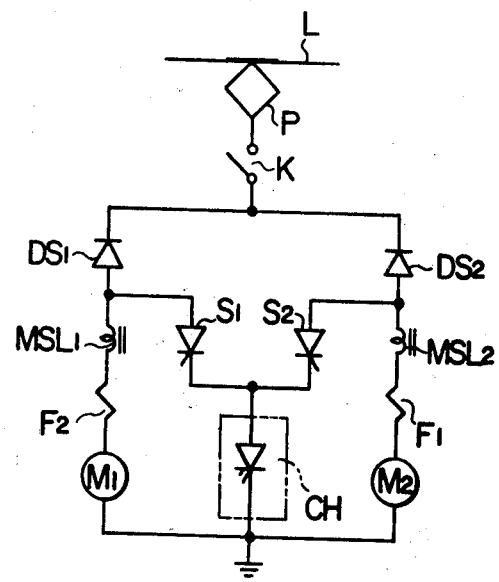
FIG. 3 is a circuit diagram showing an embodiment of the present invention.
Figure 4:
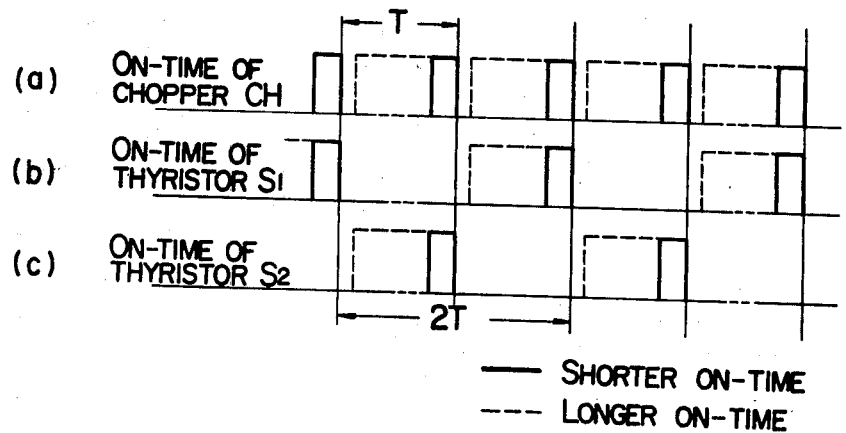
FIG. 4 is a diagram for explaining the operation of the chopper and thyristors shown in FIG. 3.

An embodiment of the present invention is illustrated in FIG. 3 which shows a regenerative brake control circuit operated at a speed higher than the rated speed of the motor. The diagram of FIG. 4 is for explaining the operation of the circuit of FIG. 3. In FIG. 3, like the circuit of FIG. 2, a couple of motor circuits each including a motor and a reactor are connected in parallel in such a manner that their field windings are cross-connected, and that a chopper CH is connected in parallel with each of the motor circuits through semiconductor switches such as thyristors $S_1$ and $S_2$ respectively. The operation of the circuit of FIG. 3 will be explained below with reference to FIG. 4.

The chopper CH is subjected to on-off operation at control periods of T as shown in diagram a of FIG. 4, while the thyristors $S_1$ and $S_2$ are turned on and off alternately in synchronism with the on-off operation of the chopper CH as shown in b and c of FIG. 4 respectively, the thyristors $S_1$ and $S_2$ being automatically de-energized by the turning off of the chopper CH.

Thus, the current in each of the motor circuits is controlled at the control cycle of 2T by the on-off operation of the thyristors $S_1$ and $S_2$, so that as in the circuit of FIG. 2 the regenerative brake control can be effected at a motor speed twice as high as the rated speed where the induced voltage in the motor is substantially equal to the trolley wire voltage of 1500 V. At the point where the induced voltage of the motor is 1500 V, the conducting period of the chopper CH and the thyristors $S_1$ and $S_2$ is short as indicated by solid lines in FIG. 4.

As the induced voltage of the motor becomes lower than 1500 V with the decrease in motor speed, the conducting period of the chopper CH and thyristors $S_1$ and $S_2$ becomes longer as indicated by dotted lines in FIG. 4.

When the motor speed is decreased to a point where the induced voltage of the motor is 750 V, that is, half the trolley wire voltage, the conducting period of the chopper CH becomes substantially equal to the control cycle T not considering the several hundred microseconds required for turning off the thyristors $S_1$ and $S_2$, whereas the conducting state of the thyristors $S_1$ and $S_2$ continues for a period almost half the control cycle therefor 2T.

Thus, with circuit of FIG. 3, when the motor speed is reduced to a point where the induced voltage of the motor is below 750 V, it is necessary to increase the conducting period of the chopper to a period longer than its control cycle T, thereby rendering it impossible to turn off the thyristors $S_1$ and $S_2$.

Figure 5:
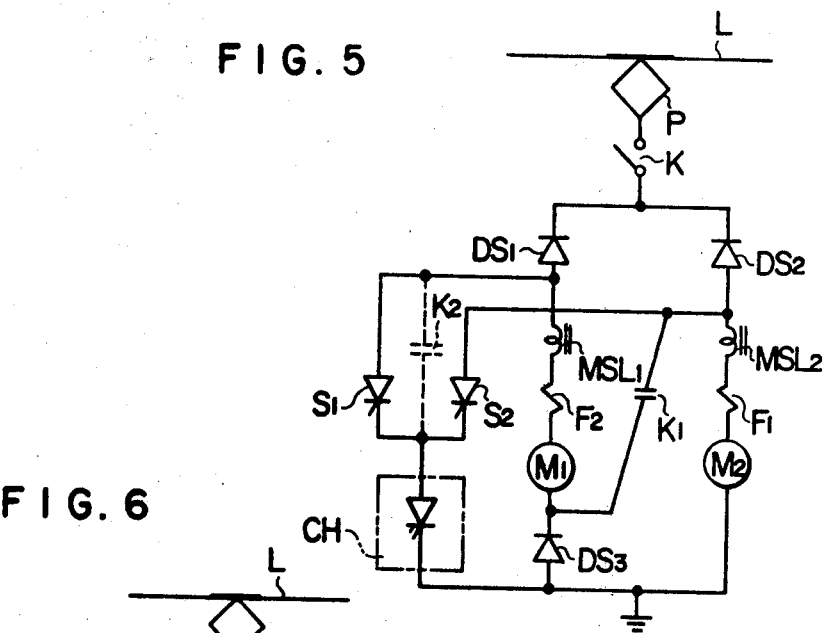
FIG. 5 is a diagram showing a reconnection of the circuit of FIG. 3 at low motor speeds.

The diagram of FIG. 5 shows another version of the circuit of FIG. 3 reconnected so as to be able to effect regenerative braking even at a speed below the rated speed of the motor. In other words, it shows an arrangement with which the regenerative brake control is possible for various motor speeds ranging from a speed twice as high as the rated value where the induced voltage of the motor is 1500 V down to a low speed where the induced voltage is almost zero. In addition to the component elements of the circuit of FIG. 3, the circuit of FIG. 5 further includes a switch $K_1$ and diode $DS_3$ as shown. In the motor speed range where the induced voltage of the motor is between 1500 V and 750 V, the switch $K_1$ is kept open, so that the motor current or regenerative brake current is controlled by quite the same circuit arrangement as shown in FIG. 3. When the induced voltage of the motor falls to 750 V, the switch $K_1$ is closed and the motors are connected in series, at the conducting period of the chopper CH being reduced to a minimum. In other words, as the result of connecting the motors in series, the sum of the induced voltages of the motors becomes 1500 V, and the control operation begins with the minimum conducting period of the chopper CH, so that the regenerative brake control is possible by the on-off operation of the chopper CH as in the circuit of FIG. 1 to a point of the motor speed where the induced voltage of the motors becomes almost zero. In the above operation, there is no need for controlling the thyristor $S_1$ or $S_2$ but they may be maintained respectively on or off. As an alternative measure, a switch $K_2$ which is connected in parallel with the thyristor $S_1$ as shown may be closed simultaneously with the closing of the switch $K_1$ to shunt the thyristor $S_1$. In this case, the current capacity of the thyristor $S_1$ may be reduced.

It will be seen from the above description that according to the present invention in the range of motor speed where the induced voltage of the motor is higher than its rated voltage, the motor circuits are connected in parallel, so that in synchronism with the on-off operation of the chopper CH connected in parallel with the motor circuits through thyristors $S_1$ and $S_2$ respectively, the thyristors $S_1$ and $S_2$ are turned on and off alternately to thereby effect the regenerative brake control. In the motor speed range where the induced voltage of the motors is lower than the rated voltage thereof, the motor circuits are reconnected in series, so that the regenerative control is effected by turning on and off the chopper CH connected in parallel with the series-connected motor circuits. One of the advantages of the invention resides in that the regenerative brake control for a couple of motors is effected by a single chopper CH. Also, the thyristors $S_1$ and $S_2$ need not be provided with any extinguishers and therefore the circuit according to the invention is very low in production cost compared with the circuit of FIG. 2.

Further, in spite of the fact that the conducting time of the chopper which depends on the operation time of the extinguisher circuit and can not be reduced to below the order of 200 to 300 microseconds, the series connection of the chopper and the thyristors as shown in FIG. 3 permits the turning-on of the thyristors to be delayed behind that of the chopper, so that the minimum effective turn-on time of the chopper to the motor circuits can be varied continuously from almost zero. This advantage will be explained more in detail below with reference to the chopper for controlling an electric car as an example.

To reduce the inductive interference propagated through the trolley wires, the choppers presently in use for the controlling of electric cars are operated in the control cycle of approximately 3 milliseconds which is well apart from the particular frequencies used in the communication systems. As a result, the minimum duty factor of the chopper, that is, the ratio of the minimum turn-on period of the chopper to the control cycle thereof is in the range of 200/3000 to 300/3000, i.e., about 0.065 to 0.1. If the trolley wire voltage is 1500 V, the minimum voltage applied to the motor circuits or a load is 1500 V × (0.065 to 0.1), i.e., approximately 100 to 150 V. Since the resistance of the motor circuits is on the order of 0.2 Ω, the current as large as 500 to 750 A flows. In order to prevent this large current from giving rise to a great shock and hence a great uncomfortableness to passengers at the time of starting the electric car, resistors are inserted in the motor circuits to control the starting current at the order of 200 to 300 A. Such additional resistors need not be inserted in the circuit according to the present invention, because with the invented circuit the minimum effective conducting period or minimum duty factor of the chopper can be started from zero by delaying the firing of the thyristors connected in series with the chopper. In addition, the fact that the minimum conducting period of the chopper itself may be longer than 200 to 300 μs permits use of thyristors with a longer turn-off time, thus leading to the very great advantage that a chopper of low cost may be employed.

Figure 6:
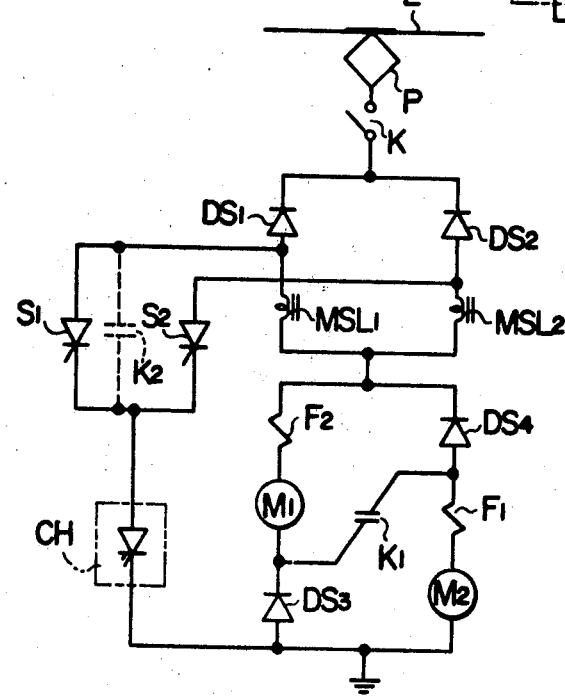
FIG. 6 is a diagram showing another embodiment of the present invention.
Figure 7:
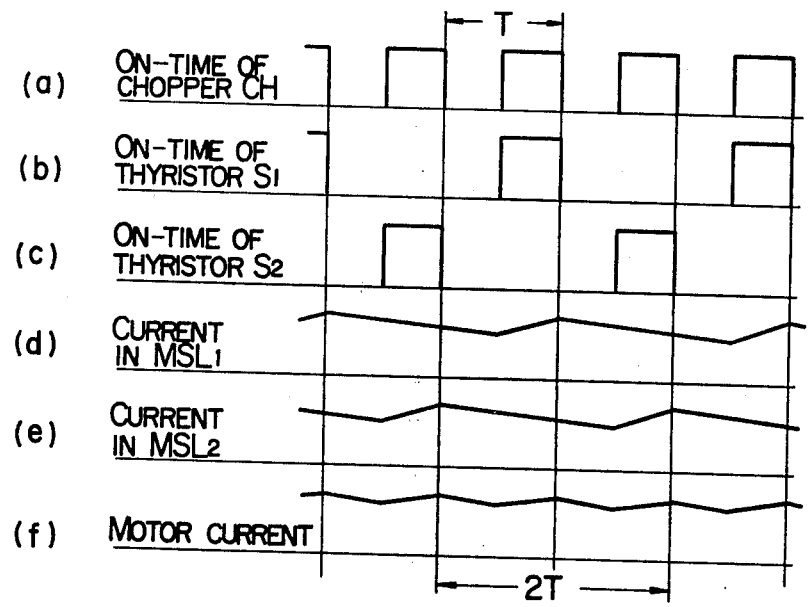
FIG. 7 is a diagram for explaining the operation of the circuit of FIG. 6.

Another embodiment of the invention will be explained with reference to FIG. 6. This embodiment relates to a circuit for reducing the pulsating factor of the motor current. As is apparent from the drawing, reactors $MSL_1$ and $MSL_2$ each of which has one end thereof connected in common are connected in series with a motor circuit. The diagram of FIG. 7 is for explaining the operation of the circuit of FIG. 6 in the case of the speed range where the induced voltage in the motor is higher than its rated voltage. The currents in reactors $MSL_1$ and $MSL_2$ pulsate as shown in diagrams $d$ and $e$ of FIG. 7 according to the on-off operation of the thyristors $S_1$ and $S_2$ in synchronism with the chopper CH. Differing from the circuits of FIGS. 3 and 5 in which the reactor current is equal to the motor current and in which it is necessary for reducing the pulsation of the current either to decrease the control cycle T of the chopper CH or to enlarge the reactor, the circuit of FIG. 7 provides very small pulsation of the current, since the motor current is the sum of the reactor currents as will be seen in $f$ of FIG. 7.

Although the above-described embodiments involve a couple of motors, the present invention may be applied with equal effect to the case where motor circuits each including two or more motors are connected in parallel with each other.

What we claim is:

1. A regenerative brake control circuit for a plurality of motors, comprising a plurality of reactors each connected in series with each of said plurality of motors, a plurality of switching means, one end of each of said switching means being connected to one end of said series circuit including said motor and reactor, a chopper circuit having one end thereof connected electrically to the other end of each of said switching means, the other end of said chopper circuit being electrically connected to the other end of each of said series circuits including motor and reactor, and a plurality of source current blocking means through which said motor circuits are connected to a power supply, said source current blocking means preventing the source voltage from being applied to said chopper circuit during the conducting period of said chopper circuit.

2. A regenerative brake control circuit according to claim 1, in which each of said switching means comprises a thyristor.

3. A regenerative brake control circuit according to claim 2, in which said plurality of series circuits comprise a first and a second series circuits each including a motor and a reactor in series, said regenerative brake control circuit further comprising a reverse current blocking means for allowing current to flow only in one direction, said reverse current blocking means being inserted between said other end of said chopper circuit and said other end of said second series circuit, a breaker means being connected between said other end of said second series circuit and said one end of said first series circuit, said breaker means being closed when the speed of said motors is reduced below a predetermined level.

4. A regenerative brake control circuit according to claim 2, in which means are provided for connecting the motor side terminals of said plurality of reactors in common.

5. A regenerative brake control circuit according to claim 4, in which there is provided a second reverse current blocking means inserted between the reactor side terminal of said motor of said first motor circuit and said reactor of said first motor circuit, said second reverse current blocking means allowing the passage of current in only one direction.

6. A regenerative brake control circuit according to claim 5, in which there is provided a second breaker means inserted between the reactor side terminal of said second motor circuit and said chopper circuit, said second breaker means being connected in parallel with said thyristors and operatively interlocked with said first breaker means so as to be opened or closed concurrently with said first breaker means.

7. A regenerative brake control circuit according to claim 6, in which each of said first and second reverse current blocking means comprises a diode.

* * * * *